3,257,438
PROCESS FOR REMOVING STILBENE FROM TALL OIL FATTY ACIDS
Alfred F. Wicke, Jr., Henry E. McLaughlin, and Joseph H. Stump, Jr., Pensacola, Fla., assignors, by mesne assignments, to Tenneco Chemicals, Inc., a corporation of Delaware
No Drawing. Filed May 18, 1962, Ser. No. 196,000
5 Claims. (Cl. 260—419)

The present invention relates to a novel method of treating tall oil fatty acids to improve their characteristics and also relates to the novel products obtained and their use.

Large quantities of tall oil fatty acids are produced and used commercially in the production of a large variety of products. Refined tall oil fatty acids generally contain about 90–98% fatty acids with the remainder being various impurities. These impurities render the fatty acids undesirable or less desirable for many purposes. For example, when tall oil fatty acids are epoxidized, an undesirable red color usually develops. Tall oil fatty acids usually contain a small amount of rosin acids as shown by a positive reaction to the Liebermann-Storch test. The presence of this small amount of rosin often 1% or less, frequently is undesirable. For example, these tall oil fatty acids cannot be used in the production of alkyd resins where the specifications for the resins require the use of tall oil fatty acids free of rosin acids as shown by the Liebermann-Storch test.

We have discovered a method of treating tall oil fatty acids to remove most of the impurities including most of the stilbene compounds. Removal of these stilbene compounds eliminates or greatly reduces the development of the red color upon epoxidation of the tall oil fatty acids. In addition, the product is lighter in color, is free of rosin acids, has a higher saponification value, a higher acid value, better color stability, and a lower unsaponifiable content than the original material. These and other advantages of the present process and the product produced will become more readily apparent from the detailed description hereinafter set forth.

In accordance with the present process, the tall oil fatty acids are treated with a catalytic amount of boron trifluoride to convert at least a major portion of the original stilbene compounds to one or more stilbene derivatives which boil at a higher temperature, the catalyst is then removed, and the treated tall oil fatty acids are distilled to separate the tall oil fatty acids from a residue containing a major portion of the stilbene impurity originally present in the starting material. The chemical reactions involved are not fully understood and the present invention is not limited to any particular chemical reaction. The stilbene present in the original fatty acids are derivatives having absorption maxima at 298 m$\mu$ and 305 m$\mu$, tentatively identified as 3,4- and 3,5-disubstituted stilbene derivaties including 3-hydroxy-5-methoxystilbene. The present process converts most of the original stilbene impurity to material having a boiling point higher than the boiling point of the fatty acids so that fatty acids of high purity can be separated by distillation from a residue containing most of the stilbene derivatives originally present.

The boron trifluoride catalyst may be boron trifluoride, as such although it is preferred to use boron trifluoride in the form of a molecular compound with an organic compound, such as an alcohol, ether, ester, acid, amine, or phenol. Illustrative of the organic compounds that may be used to form the boron trifluoride complex are diethyl ether, dipropyl ether, methyl acetate, acetic acid, propionic acid, ethanol, propanol, phenol, cresol, monoethyl amine, urea, and piperidine. Best results have been obtained with boron trifluoride etherate, a molecular compound of boron trifluoride and diethyl ether containing about 45–50% boron trifluoride. The amount of catalyst may be varied considerably. As little as ¼% of catalyst, based on the weight of tall oil fatty acid starting material will produce a noticeable effect. Preferably a minimum of about ½% of catalyst is used. Much larger amounts of catalyst may be used. However, the catalyst must be removed prior to the distillation step and accordingly, not more than 2% of catalyst will be used normally. However, larger amounts may be used. For most tall oil fatty acids containing from 0.1% to 0.5% stilbene compound, calculated as 3-hydroxy-5-methoxystilbene, excellent results are obtained with about 1% of catalyst. The percent catalyst is by weight of the tall oil fatty acids originally charged.

The chemical reaction or reactions involved in the presence of the catalyst take place readily at room temperature. The catalyst is mixed with the tall oil fatty acids and the mixture held until a major amount, preferably at least 90%, of the stilbene originally present has been converted to a material which will remain in the residue at about 290–300° C. when the treated tall oil fatty acids are distilled under partial vacuum. Good results have been obtained when the tall oil fatty acids and catalyst were agitated at 30–100° C. for 2–25 hours.

The catalyst must be removed prior to distillation to avoid formation of an undesirably large residue as the result of side reactions. The catalyst can be removed by washing the tall oil fatty acids-catalyst mixture with water. Removal of the catalyst is facilitated by the use of hot water at a temperature of at least 60° C. with best results being obtained when the wash water is at a temperature in the range of 75–100° C. Cooler water can be used. In order to facilitate complete removal of the catalyst it is preferable, but not essential, that the wash water be alkaline and contain a water soluble, alkaline compound of sodium or potassium, for example, sodium hydroxide or potassium hydroxide. The amount of alkali metal hydroxide added may be up to 100% based on the weight of catalyst. However, excellent results are obtained with from 10% to 100% of sodium hydroxide based on the amount of catalyst. While larger amounts of sodium hydroxide or the like may be used, larger amounts are not necessary. Some of the sodium hydroxide will saponify some of the fatty acids and accordingly, it is preferable not to use a large excess. Prior to separation of the alkaline wash water from the treated fatty acids, it is preferable that a small amount of acid be added. Any strong acid may be used that will neutralize any free alkali and will convert any saponified fatty acid back to the acid form. The saponified acids tend to hinder separation of the wash water layer. By adding sufficient acid to neutralize the free alkali in the wash water or render the wash water slightly acidic, there is obtained better separation of the wash water from the tall oil fatty acids. Excellent results have been obtained with acetic acid. However, other acids including mineral acids may be used for this purpose.

The washed fatty acids are heated and distilled under partial vacuum to separate the distillate of tall oil fatty acids from the stilbene-containing, higher boiling fraction. Distillation is carried out under partial vacuum to avoid heating to a maximum temperature of above 310° C. Preferably, heating to above 290–300° C. is avoided to prevent undesirable decomposition of fatty acids. Excellent results have been obtained at a pressure of from 3 to 6 mm. of mercury, although higher pressures may be used as long as heating to above 310° C. can be avoided. The amount of still residue will vary depending to a certain extent upon the amount of impurities present in the starting material, but under normal conditions the residue or highest boiling fraction will constitute from 5% to 20% by weight of the tall oil fatty acids charged. All of the distillate, the purified tall oil fatty acids, will contain only a small fraction, usually less than 10% of the amount of stilbene present in the original fatty acids. The first portion or lowest boiling portion of the distillate may, at times, contain a higher percentage of stilbene than the remainder so that optimum results are often obtained by taking a forecut or "head" cut of up to 20%, based on the amount of fatty acids charged. The product remaining after the final cut and the forecut, if any, will be 65%–95% of the charge and normally will be 70%–90% of the original charge. Very good results are usually obtained when separating the residual cut of about 10% and a forecut of about 10%. The amount of the forecut will vary to a certain extent upon the original stilbene content but all of the distillate including the forecut contains a lower percentage of stilbene than the original tall oil fatty acids. In accordance with the present process tall oil fatty acids containing 0.1%, usually more, stilbene can be treated to obtain a product containing less than 0.04% stilbene, usually in a yield of 80%, or better.

EXAMPLE 1

In this run 500 grams of a commercially available refined tall oil fatty acids having a low rosin content were charged into a 1000 ml. flask equipped with a stirrer and thermometer. The charge was stirred at ambient temperature and 5 grams, 1% by weight of the fatty acids, of boron trifluoride etherate was added. Agitation was continued for 21 hours with the reaction mixture at room temperature. The treated tall oil fatty acids were washed twice with separate 125 ml. portions of water at 90° C. and the wash water separated. The fatty acids were then washed with 125 ml. of water at 90° C. containing 1.25 gram of sodium hydroxide. After thorough agitation of the fatty acids and the wash water containing the sodium hydroxide, 2.5 grams of acetic acid was added and the mixture agitated to break the slight emulsion which formed. The wash water was then separated. In each instance the wash water was separated by allowing the mixture to stand and separating the layer of wash water which formed readily.

The treated fatty acids from which the catalyst has been removed was charged to a still at the bottom of an 8-plate distillation column. The charge was heated and distilled under a pressure of 3–6 mm. mercury until the residue in the still reached a temperature of about 295° C. During distillation ten cuts of the distillate from the top of the column were taken and these cuts were substantially equal in volume. The residue weighed 48.5 grams, 9.7% by weight of the original charge so that each cut constituted about 45 grams or 9% of the charge. The foregoing percentages are based on the 500 grams of fatty acids charged originally which also is the amount charged to the still. The residue and various cuts were analyzed using an ultraviolet spectrophotometric method. The results are set forth in Table A.

Table A

| Cut number: | Percent stilbene |
|---|---|
| 1 | 0.042 |
| 2 | 0.021 |
| 4 | 0.019 |
| 6 | 0.015 |
| 8 | 0.012 |
| 9 | 0.018 |
| 10 | 0.031 |
| Residue | 2.40 |

The tall oil fatty acids originally charged contained 0.35% stilbene. It will be noted that most of the stilbene remains in the residue and that the first cut contains more stilbene than the other cuts. Without the catalyst treatment, the distillate would contain substantially all of the stilbene. The catalyst treatment causes the original stilbene derivatives to react in some manner to form a higher boiling compound or compounds which boil at a temperature higher than the monomereic fatty acids. A large portion of these higher boiling compounds are stilbene derivatives retaining the conjugated double bond system characteristic of stilbene and substituted stilbenes as shown by their detection by the UV analytical method. Some of original stilbene also is converted to higher boiling compounds, possibly polymers, which do not have the characteristic conjugated double bond system of 3-hydroxy-5-methoxystilbene. Regardless of the particular chemical reactions involved, all of the above distillate contains less than 10% of the stilbene impurity originally present in the tall oil fatty acids so that over 90% of the stilbene originally present has been converted to material boiling at a temperature higher than the fatty acids in the starting material.

Combined cuts 2–10 contain slightly less than 0.02% stilbene. The addition of the "head" cut, cut No. 1, would increase the stilbene content. However, the composite of cuts No. 1 through 10 would have a stilbene content below 0.025%, a commercially satisfactory product.

EXAMPLE 2

A second run was made under the same conditions and using tall oil fatty acids having the same analysis as those in Example 1 with substantially the same results. The still residue was 10.2% and cut No. 2 contained 0.027% stilbene and a composite of cuts No. 2–10 contained 0.019% stilbene.

EXAMPLE 3

A mixture of 500 grams of the same tall oil fatty acids as used in Example 1 and five grams of boron trifluoride etherate was agitated for 3 hours at 50° C. The catalyst was removed by washing with three 250 ml. portions of hot water. The washed fatty acids were charged to a still at the bottom of an eight-plate fractionating column and heating and distillation continued under a pressure of 3–6 mm. of Hg until the still residue reached a temperature of 290–300° C. The still residue weighed 50 grams, about 10% by weight of the material charged to the still. During distillation nine substantially equal cuts of distillate were taken. Cuts 2 through 8 were combined and were found to contain 0.022% stilbene. Based on the material charged, the product cut was 70%, the forecut 10%, and the final cut containing the highest boiling fraction, residue plus cut No. 9, was 20%. While cut No. 9 was not included in the product cut, it could have been included.

EXAMPLE 4

A mixture of 500 grams of tall oil fatty acids (same as Example 1) and five grams of boron trifluoride etherate was agitated at room temperature for 17 hours and then washed with three 250 ml. portions of hot water. The tall oil fatty acids were charged to a still equipped with an 8-plate fractionating column. The charge was heated and distilled under a pressure of 3–6 mm. Hg until the still residue reached a temperature of 290–300° C. The residue was 14%. A small forecut was taken and was found to contain some of the catalyst which accounts for the higher amount of residue. The middles or product contained 0.028% stilbene and constituted 80% of the charge to the still.

EXAMPLE 5

Five grams of boron trifluoride etherate and 500 grams of tall oil fatty acids, the same as used in Example 1, were agitated at room temperature for 20 hours and thereafter washed with four 250 ml. portions of hot water. The acids were finally washed with 250 ml. of hot water containing 2.5 grams of sodium hydroxide and prior to separation of the final wash 5 grams of acetic acid were added. The washed acids were distilled as in Example 1. The residue was 9%, the forecut was 10%, and the product cut about 80% of the charge. The product contained 0.006% stilbene.

EXAMPLES 6, 7 AND 8

In each of these three examples, a mixture of 5 grams of boron trifluoride etherate and 500 grams of tall oil fatty acids was agitated at room temperature and then washed twice with 125 ml. portions of 90 C. water. The third wash water of 125 ml. contained 1.25 grams of sodium hydroxide and 2.5 grams of acetic acid were added to the mixture prior to separation of the final wash. In Examples 6 and 7 the period of agitation of the mixture was 23½ hours and in Example 8 this period was 17½ hours. In each example the washed tall oil fatty acids were distilled under a pressure of 3–6 mm. Hg; however, different distillation procedures were used. Example 6 was distilled in the same manner as in Example 1.

The acids of Example 7 were steamed distilled while in Example 8 the acids were pot-distilled without a fractionating column. The results are set forth in the following table.

Table

| Ex. | Residue, percent | Head Cut, percent | Product Cut, percent | Stilbene |
|---|---|---|---|---|
| 6 | 13 | 12 | 75 | 0.015 |
| 7 | 8 | 10 | 65 | 0.026 |
| 8 | 7 | 8 | 85 | 0.022 |

In Example 7, the product cut which was analyzed was a middles cut, that is, both a head cut and a final cut of the distillate were not included. However, the final cut could have been included which would have increased the product cut to about 80%.

To illustrate the effect of 3-hydroxy-5-methoxystilbene on the color of epoxidized tall oil fatty acids, tall oil acids containing 0.14%, 0.006%, 0.022% and 0.039% were epoxidized by known means and the products had Gardner colors of 14, 1, 3, 3, respectively. As little as 0.14% causes the formation of a marked red color. While the presence of 0.039% did cause a slight increase from a Gardner color of 1–2 to a Gardner color of 3, this slight increase is not particularly undesirable and for present purposes it is considered that tall oil fatty acids containing less than 0.04% 3-hydroxy-5-methoxystilbene are commercially satisfactory, although less than 0.03% stilbene is preferred.

The tall oil fatty acids produced by the present process are better than the untreated acids in a number of respects as shown by the comparison of the refined tall oil fatty acids used as starting material in the foregoing examples with products produced by the present process. For comparison, the products of Examples 1 and 2 were combined and are referred to as "$BF_3$ treated" tall oil fatty acids.

| | $BF_3$ treated | Non-treated |
|---|---|---|
| Saponification No. | 199.5 | 197 |
| Acid Value | 199 | 195 |
| Iodine No. | 125 | 130 |
| Titer, ° C. | +9.4 | +5 |
| Percent Unsaponifiable | 1.1 | 1.5 |
| Percent Rosin Acids | 0 | 1 |
| Percent Fatty Acids | 98.9 | 97.5 |

The proportions of the acids present in tall oil fatty acids will vary to some extent depending upon the source and method used to separate and refine the tall oil fatty acids, however, tall oil fatty acids primarily consist of oleic acid and linoleic acid with up to about 15% of other fatty acids. Usually, all of the fatty acids containing one double bond and eighteen carbon atoms are considered as being oleic acid and all of the fatty acids containing two double bonds and eighteen carbon atoms are considered as being linoleic acid. While the oleic and linoleic acids may be present in equal amounts there usually is present somewhat more oleic acid than linoleic acid. Typical, refined tall oil fatty acids contain about 45–55% oleic acid, about 35–50% linoleic acid and about 5–15% other acids.

It has been found that when tall oil fatty acids are treated in accordance with the present process, the product contains a larger amount, over 60%, of oleic acid and a smaller amount, less than 35% of linoleic acid. Some of the fatty acids, including a substantial amount of the linoleic acid, may be converted to a relatively higher boiling product which remains in the residue. Regardless of the chemical reactions involved the product obtained upon distillation and separation of the residue does contain a higher percentage of oleic acid and a smaller percentage of linoleic acid than the starting material. The amount of stearic acid is not substantially increased.

The following table sets forth the analysis of the fatty acids in the combined products of Examples 1 and 2 ($BF_3$ treated), and in the tall oil fatty acids prior to treatment (untreated).

Table

| | $BF_3$ treated | Untreated |
|---|---|---|
| $C_{18}$ Sat | 1.8% | 2.6% |
| $C_{18}=$ | =64.8 | 52.8 |
| $C_{18}==$ Unconj | 26.3 | 34.8 |
| $C_{18}==$ Conj | 2.7 | 5.7 |
| Other Fatty Acids | 4.4% | 4.1% |

In the foregoing table, "$C_{18}$" means fatty acids containing eighteen carbon atoms, "$=$" means one carbon to carbon double bond, and "$==$" means there are two double bonds present. It will be noted that the tall oil fatty acids treated in accordance with the present invention contain 12% more fatty acid containing eighteen carbon atoms and one double bond than does the starting material. The treated acids contain 11.5% less acids containing two double bonds. It also will be noted that both the treated and non-treated acids contain about 93% of acids containing eighteen carbon atoms which is the total amount of oleic acid and linoleic acids. Generally, in describing tall oil fatty acids all of the acids containing 18 carbon atoms and containing one double bond are referred to as oleic acid although the cis and trans acids may be present.

The present process in addition to being used to treat tall oil fatty acids to remove stilbene and/or rosin, can be used to treat tall oil fatty acids to obtain a novel tall oil fatty acids product. This product contains about 60–70% oleic acid, about 20–30% linoleic acid, and about 5–15% other acids with the amount of oleic acid being from 2 to 3 times as large as the amount of linoleic acid. If the tall fatty acids prior to treatment contains less than 5% of such other acids then, the product will contain less than 5% of the other acids.

The present refined tall oil fatty acids, in addition to being useful in the production of alkyd resins and epoxidized esters, have been found to be particularly useful as textile lubricants. Lubricants are applied to threads and fabrics of cotton wool and synthetics to facilitate their handling and processing and to provide the desired textile characteristics in the finished or semi-finished material.

Commercial oleic acid, "white oleic," is used extensively as a textile lubricant. The oleic acid is/or may be applied by spraying the acid onto the fabric or the fabric may be dipped in the oleic acid. A common procedure is to form an aqueous emulsion of the oleic acid and then immerse the textile in the emulsion or the emulsion can be sprayed onto the textile. Part of the oleic acid, usually about 50%, is saponified with sodium hydroxide to facilitate formation of the emulsion and to produce the type of hand desired. Usually such an emulsion will contain 0.25–5% and more frequently 0.5–1% non-aqueous material. By varying the ratio of salt to acid, it is possible to vary the hand from very scroopy to extremely soft. A high salt content produces a soft hand while a high acid content results in a scroopy hand. The pure acid results in an extremely scroopy hand.

It has been found that the present refined tall oil fatty acids can be used in place of white oleic as a textile lubricant. The refined tall oil fatty acids can be used as such. The acids may be partially saponified with sodium hydroxide and diluted with water to form an emulsion containing 0.25–5% non-aqueous material (fatty acids plus soap) and this emulsion applied to the textile, for example rayon fabric. It has been found possible to prepare any type of hand desired, from the very scroopy to the extremely soft, by varying the ratio of salt to acid in the emulsion. In addition, it has been found that the present product has excellent heat (color) stability and has excellent resistance to oxidation and the formation of odors.

Color stability of textile lubricants can be determined by A.O.C.S. tentative Method L15a–58. In this test, the fatty acids are held at 205° C. for 1 hour. The Gardner color is determined before and immediately after the test. In a series of comparative color tests, the Gardner color of the present refined tall oil fatty acids increased from 1–2 for the starting materials to only 3–4 at the end of the test. The color of a commercially available distilled tall oil fatty acids went from 2½ to 6 in the same test. The heat stability of the present refined tall oil fatty acids is much better than that of the distilled tall oil fractions.

The oxidative stability of fatty acids to be used as textile lubricants is indicated by the "tropics test." In this test, the lubricant is applied, for example, as an aqueous emulsion containing 2% fatty acids and with half the fatty acids being saponified with sodium hydroxide. The treated textile is then stored in a container at 100% relative humidity and at 55° C. for about 24 hours. The treated textile is then checked for development of odor and discoloration. Comparative tests were made using lubricants similarly prepared from a commercial textile lubricating grade of "white" oleic acid, the present refined tall oil fatty acids, and distilled tall oil fatty acids like those used as a starting material in Example 1. The "white" oleic and the present refined tall oil fatty acids held up satisfactorily in these tests while the distilled tall oil fatty acids used as a starting material in Example 1 failed. The refined tall oil fatty acids of the present invention which were used in all of the foregoing tests were the products prepared as described in Examples 1 and 2.

We claim:
1. The process of treating tall oil fatty acids containing a stilbene compound to obtain a tall oil fatty acids product relatively free of such stilbene compound comprising contacting the tall oil fatty acids and boron trifluoride catalyst, separating the catalyst from the tall oil fatty acids, and thereafter heating and distilling the tall fatty acids at a temperature below 310° C. and separating a tall oil fatty acids product fraction of distillate from a higher boiling fraction containing a substantial amount of the stilbene compound originally present.

2. The process of treating tall oil fatty acids containing stilbene impurity having ultraviolet spectrophotometric maxima at 298 m$\mu$ and 305 m$\mu$ comprising contacting with at least one boron trifluoride catalyst selected from the group consisting of boron trifluoride, and a molecular compound of boron trifluoride and an alcohol, ether, ester, amine or phenol, washing the tall oil fatty acids with an aqueous medium and thereby removing the catalyst, heating and distilling the tall oil fatty acids under partial vacuum at a temperature below 310° C., thereby separating a distillate of tall oil fatty acids from a residue containing a major portion of the stilbene impurity.

3. The process of treating tall oil fatty acids containing at least 0.1% by weight of stilbene impurity having ultraviolet spectrophotometric maxima at 298 m$\mu$ and 305 m$\mu$ comprising contacting such tall oil fatty acids with from ½ to 2% by weight of boron trifluoride etherate catalyst, separating the catalyst from the tall oil fatty acids by means of a water wash, heating and distilling the tall oil fatty acids under partial vacuum at a temperature below 310° C., and collecting a distillate of tall oil fatty acids containing less than 0.04% of said stilbene impurity.

4. The process of treating tall oil fatty acids containing at least 0.1% by weight of stilbene impurity having ultraviolet spectrophotometric maxima at 298 m$\mu$ and 305 m$\mu$ comprising contacting such tall oil fatty acids with from ½ to 2% by weight of boron trifluoride etherate catalyst, washing the tall oil fatty acids with an aqueous solution of an alkali metal compound selected from the group consisting of sodium or potassium compounds to separate the catalyst, washing the fatty acids with acidic wash water containing sufficient acid to neutralize the free alkali present and convert any saponified fatty acid to the acid form, having and distilling the tall oil fatty acids under partial vacuum and at a temperature below 300° C., and collecting a distillate of tall oil fatty acids containing less than 0.04% of the stilbene impurity.

5. The process of treating tall oil fatty acids containing at least 0.1% by weight of a stilbene impurity having ultraviolet spectrophotometric maxima at 298 m$\mu$ and 305 m$\mu$ comprising maintaining such tall oil fatty acids in contact with at least one catalyst selected from the group consisting of boron trifluoride, and a molecular compound of boron trifluoride, and an alcohol, ether, ester, amine or phenol until a major portion of such stilbene is converted to a higher boiling compound, separating the catalyst from the tall oil fatty acids by means of a water wash, heating and distilling the tall oil fatty acids under partial vacuum and at a temperature below 310° C., thereby separating a distillate of tall oil fatty acids from a residue containing a major portion of the stilbene impurity.

References Cited by the Examiner

UNITED STATES PATENTS

| | | | |
|---|---|---|---|
| 2,031,586 | 2/1936 | Binapfi et al. | 260—398 |
| 2,285,357 | 6/1942 | Robinson | 252—8.6 |
| 2,308,355 | 1/1943 | Colbeth | 252—8.6 |
| 2,482,760 | 9/1949 | Goebel | 260—407 X |
| 2,515,739 | 7/1950 | Smerechniak et al. | 260—419 X |
| 2,729,658 | 1/1956 | Croston et al. | 260—407 |
| 2,763,638 | 9/1956 | Nevin | 260—419 X |
| 2,862,943 | 12/1958 | Wheeler | 260—419 |
| 3,052,701 | 9/1962 | Hampton | 260—419 |
| 3,066,160 | 10/1962 | Hampton | 260—419 |

OTHER REFERENCES

Booth et al.: "Boron Trifluoride and Its Derivatives," J. Wiley & Sons, Inc., New York (1949), p. 42.

CHARLES B. PARKER, *Primary Examiner.*

JULIUS GREENWALD, *Examiner.*

JOHN T. FEDIGAN, ANTON H. SUTTO,
*Assistant Examiners.*